United States Patent
Das Sharma

(10) Patent No.: US 10,250,436 B2
(45) Date of Patent: Apr. 2, 2019

(54) APPLYING FRAMING RULES FOR A HIGH SPEED DATA LINK

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 4 days.

(21) Appl. No.: 15/446,395

(22) Filed: Mar. 1, 2017

(65) Prior Publication Data

US 2018/0254943 A1    Sep. 6, 2018

(51) Int. Cl.
  *H04L 12/24* (2006.01)
  *H04L 29/06* (2006.01)
  *H04L 29/08* (2006.01)

(52) U.S. Cl.
  CPC ............ *H04L 41/069* (2013.01); *H04L 69/14* (2013.01); *H04L 69/323* (2013.01)

(58) Field of Classification Search
  None
  See application file for complete search history.

(56) References Cited

U.S. PATENT DOCUMENTS

| | | | | |
|---|---|---|---|---|
| 9,311,268 B1* | 4/2016 | Chen | ..................... | G06F 11/008 |
| 2003/0198252 A1* | 10/2003 | Thrysoe | .................. | H04L 12/46 370/466 |
| 2007/0098007 A1* | 5/2007 | Prodan | ................ | H04L 12/2801 370/443 |
| 2012/0119753 A1 | 5/2012 | Kim | | |
| 2012/0137184 A1* | 5/2012 | Nakamura | ............... | H04L 41/06 714/49 |
| 2016/0182265 A1* | 6/2016 | Shulman | .................. | H04L 25/02 375/340 |
| 2016/0248682 A1 | 8/2016 | Lee et al. | | |
| 2016/0261375 A1* | 9/2016 | Roethig | ................ | H04L 1/0083 |
| 2017/0034165 A1 | 2/2017 | Bagal et al. | | |
| 2017/0222686 A1* | 8/2017 | Khan | ....................... | H04B 1/40 |

FOREIGN PATENT DOCUMENTS

| | | |
|---|---|---|
| JP | 2010187244 A | 8/2010 |
| WO | 2015099724 A1 | 7/2015 |

OTHER PUBLICATIONS

International Search Report and Written Opinion in International Application No. PCT/US2018/019702, dated Jun. 4, 2018, 11 pages.

* cited by examiner

*Primary Examiner* — Ajit Patel
(74) *Attorney, Agent, or Firm* — Alliance IP, LLC

(57) ABSTRACT

Aspects of the embodiments are directed to systems, methods, and devices for error handling of data received across a multi-Lane Link compliant with a Peripheral Component Interconnect Express (PCIe) protocol. The system can include an upstream device to transmit a data packet across a multi-Lane Link compliant with the PCIe protocol and a downstream device connected to the upstream device across a multi-Lane Link, the downstream device comprising a receiver that comprises a deframer logic. The deframer logic can identify a Framing error in a received data packet received on one Link of the multi-Lane Link; determine that one or more other data packets received on one or more other Links of the multi-Lane Link do not present a Framing error; and process the received data packet based on the one or more other data packets received on the one or more other Links.

25 Claims, 12 Drawing Sheets

555

```
┌─────────────────────────────────────────┐
│ Receive a packet with a Framing Token   │
│ at a receiver from across a Link        │  552
│ compliant with a PCIe protocol          │
└─────────────────────────────────────────┘
                    │
                    ▼
┌─────────────────────────────────────────┐
│ Determine that the Framing Token is an  │
│ SDP type Framing Token based on a first │  554
│ Symbol received                         │
└─────────────────────────────────────────┘
                    │
                    ▼
┌─────────────────────────────────────────┐
│ Identify an error in a second Symbol of │  556
│ the received Framing Token              │
└─────────────────────────────────────────┘
                    │
                    ▼
┌─────────────────────────────────────────┐
│ Identify a nearest hamming distance     │
│ between the received second Symbol and  │  558
│ a second Symbol associated with an SDP  │
│ Framing Token                           │
└─────────────────────────────────────────┘
                    │
                    ▼
┌─────────────────────────────────────────┐
│ Infer that the received Framing Token   │
│ is an SDP type Framing Token based on   │
│ the hamming distance of the received    │  560
│ second and the second Symbol of an SDP  │
│ Framing Token                           │
└─────────────────────────────────────────┘
                    │
                    ▼
┌─────────────────────────────────────────┐
│ Validate the inference using a received │  562
│ subsequent Symbol (e.g., second, third, │
│ etc.)                                   │
└─────────────────────────────────────────┘
                    │
                    ▼
┌─────────────────────────────────────────┐
│ Process the packet based on the         │  564
│ inferred known Framing Token            │
└─────────────────────────────────────────┘
```

FIG. 5B

APPLYING FRAMING RULES FOR A HIGH SPEED DATA LINK

FIELD

This disclosure pertains applying one or more Framing rules for errors in data packets that are received over a high speed data Link.

BACKGROUND

Large data centers deploy tens of thousands of nodes, working collaboratively on certain tasks, with each node having multiple high-speed data Links (such as Peripheral Component Interconnect Express (PCIe) data Links). The nodes demand a predictable performance across all their components/interconnects, including those with PCIe Links. As part of that predictable performance guarantee, some data center customers are demanding a bit error rate (BER) much better than the $10^{12}$ BER that the baseline PCIe specification requires.

BRIEF DESCRIPTION OF THE DRAWINGS

FIG. 5B is a process flow diagram for handling an error in a subsequent Symbol of an SDP Framing Token in accordance with embodiments of the present disclosure.

DETAILED DESCRIPTION

Figure 1:
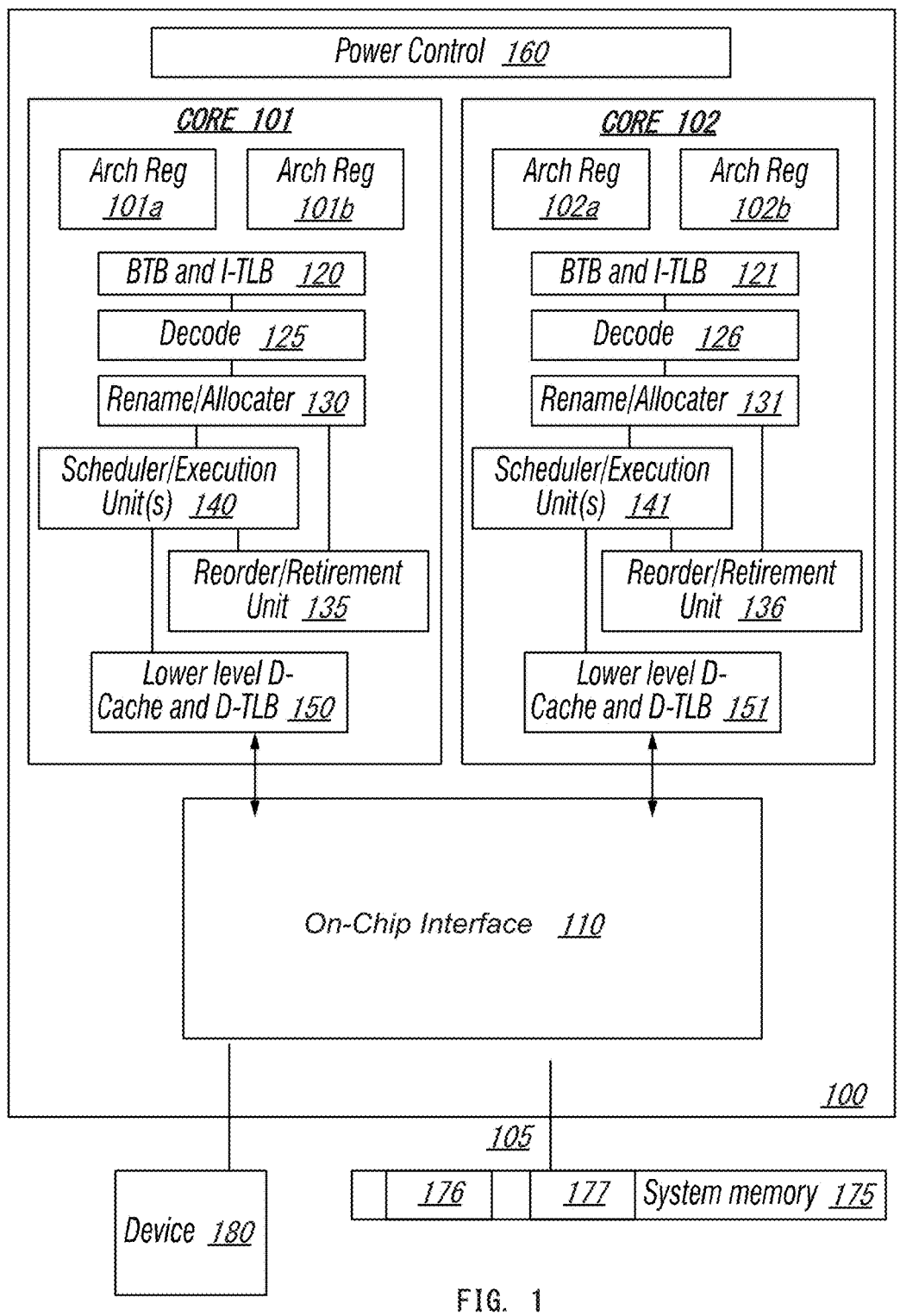
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof. As mentioned above, the PCIe specification sets a BER of at least $10^{-12}$, which is sufficient to guarantee a failures in time (FIT) rate of close to 0 when used in conjunction with its error detection/recovery mechanisms (cyclic redundancy check—CRC, physical layer Framing protection, retry, retraining, etc.). Some PCIe components can be designed to exceed that BER performance goal by several orders of magnitude, since the PCIe components have to be designed for the worst case PVT and channel variations. These components tend to be high value components that may be expensive from a cost standpoint or by a processing resource standpoint. PCIe components that barely meet the specification mandated BER can be a bottleneck hindering achieving reliable high speed data transmission.

For example, bit errors manifesting themselves in the physical layer Framing bits (such as sync header, Framing Tokens) result in the Link entering Recovery, which can take several micro-seconds, before the Link is able to resume normal traffic. This can happen once every 10 seconds in a ×16 Gen 4 Link (the BER translates to one error every minute per Lane, which translates to an error every 4 seconds, after applying some derating for Framing bits we can expect an error in the order of every 10 seconds). Designs that are expected to barely meet the BER targets as the PCIe frequency increases and the channel constraints are pushed to the limits. Even though the PCIe specification strongly recommends that the time through recovery due to a Framing error be less than 1 µsec, most implementations take the same amount of time as they would when they are training after an electrical idle event such as low-power L1 state. This problem will be exacerbated in the presence of re-timers.

This disclosure describes Framing rules that mitigate the effects of Framing errors resulting in the PCIe Link entering recovery in multi-Lane Links, while preserving the reliability through the triple bit flip detection guarantee (and the resultant FIT rate) of the PCIe Links. The systems and methods described herein makes use of the redundant information present in multi-Lane Links to correct bit flips in the physical layer Framing bits. These manifest as relaxing the Framing rules requirements for recovery and retraining by taking advantage of the redundancy in a multi-Lane Link, which can be enabled through a set of configuration registers. The systems and methods described herein improve the PCIe Link availability and consequently results in predictable performance by significantly mitigating entry to recovery due to Framing errors in multi-Lane Links without compromising on the underlying Link reliability.

Figure 2:
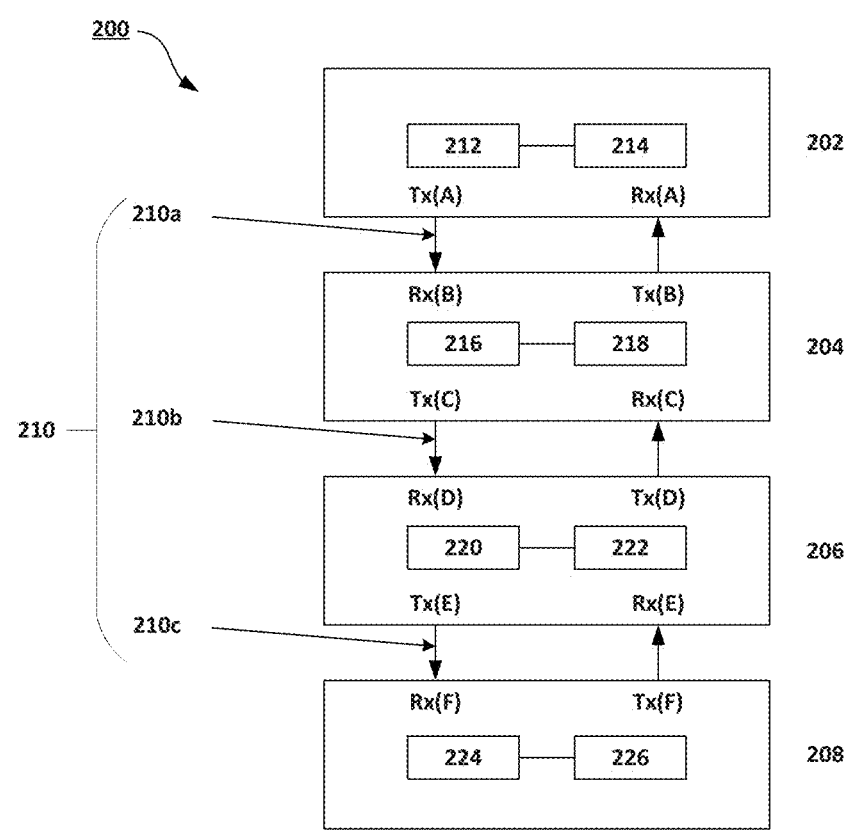
FIG. 2 is a schematic and timing diagram illustrating a sample topology with two re-timers between an upstream component and a downstream component in accordance with embodiments of the present disclosure.

FIG. 2 is a schematic and timing diagram illustrating a sample topology 200 with two re-timers 204 and 206 between an upstream component 202 and a downstream component 208 in accordance with embodiments of the present disclosure. The upstream component 202 can be a PCIe compliant device, such as a CPU or other device capable of generating a data packet and transmitting the data packet across a data Link compliant with the PCIe protocol. The downstream component 208 can be a peripheral component that can receive a data packet from a Link compliant with the PCIe protocol. It is understood that the upstream component 202 and the downstream component 208 can transmit and receive data packets across a PCIe Link. The upstream component 202 can include a deframer logic 212 and error log 214. The downstream component 208 can include a deframer logic 224 and error log 226.

The topology 200 can include one or more re-timers 204 and 206. A re-timer 204 and 206 can serve as a signal repeater operating at the physical layer to fine tune the signal from the upstream component 202 and/or the downstream component 208. A re-timer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer. In embodiments, the re-timers 204 and/or 206 can include one or more deframer logic 216 and error log 218 and deframer logic 220 and error log 222, respectively.

The upstream component 202 can be coupled to re-timer 204 by a multi-Lane PCIe Link 210. The multi-Lane PCIe Link is split into three Link segments (LS) in each direction, such as downstream LS 210a, 210b, and 210c.

In multi-Lane PCIe Links, such as multi-Lane PCIe Link 210, the Framing rules outlined in the PCIe specification can be relaxed, while meeting the guaranteed triple bit flip detection provided by the spec and without causing any reliability issues/FIT increase. The following list of Framing procedures can be implemented in the upstream component 202 and/or downstream component 208 and/or in the re-timers 204 and 206. A configuration register can enable the implementation of each of these procedures to offer the flexibility of selectively relaxing some rules depending on the usage models.

1) Error in Sync Header: Examples of a sync header include a corruption in sync header bits (e.g., 00b, 11b, or getting an ordered set without an EDS Token). For multi-Lane Links, one or two Lanes that have this error (represents 1 to 4 bit flips) can be ignored and data transmission can still be deemed reliable as long as the rest of the wires (2+) gives the correct sync header. For two or more wires to give the "correct" sync header and still be in error means that at least 4 bit flips exist and a massive error can exist that causes the addition or omission of an EDS marker. in such situations, a retraining can be performed. Thus, for ×4, ×8, or ×16 Link, sync header errors in up to 2 wires can be safely ignored.

2) Error in IDL Token: This is the most common error when the Link is in idle state. For the idle state, all Lanes should be transmitting IDLs. If an IDL is received in Lane 0, non-IDL Tokens received in the remaining Lanes can be ignored (can upper bound that to up to 2-3 Lanes). In a multi-Lane Link, a start transaction layer packet (STP) type packet, a start of data Link layer packet (SDP) type packet, or end bad (EDB) type packet do not start in a non-Lane 0 if Lane 0 has an IDL Token.

3) Error in first Symbol of the Framing Token: This scenario uses subsequent Symbols to validate the first Symbol to make an inference about the type of packet received. The following first Symbols are used for Framing Tokens: IDL: 0000_0000; STP: 1111_xxx; SDP: 0000_1111; and EDB: 0000_0011. All of these first Symbols are followed by subsequent Symbols that can be used for validation purposes (in the case of a multi-Lane link). For IDL, the second Symbol is 0000_0000. For STP, the second Symbol's Length and CRC/parity fields should match in Symbols 1 and 2 and 3. For SDP, the second Symbol is 0011_0101. For EDB, the second Symbol is 0000_0011. Put more generally, the deframing logic can determining the first Symbol's closest hamming distance and assumes it is a corresponding Framing Token. The deframing logic validates the inference using the subsequent (second) Symbol. For STP/IDL/EDB, further subsequent (e.g., third Symbol) to validate the Framing Token further. A possible listing of such mappings with single bit flip is given in the table below:

| No of bit flips | 1st Symbol of Framing Token in error (possible in Lanes 0, 4, 8, 12) | Other conditions | Inference |
| --- | --- | --- | --- |
| 1 | 0000_0001, 0000_0010, 0000_0100, 0000_1000, 0001_0000, 0010_0000, 0100_0000, 1000_0000 | Symbol 2 = IDL (0000_0000) | IDL (0000_0000) |
| 1 | 0000_1110, 0000_1101, 0000_1011, 0000_0111, 0001_1111, 0010_1111, 0100_1111, 1000_1111 | Symbol 2 = ACh (0011_0101) | SDP (0000_1111) |
| 1 | 1110_xxxx, 1101_xxxx, 1011_xxxx, 0111_xxxx | Len and CRC/parity fields match in Symbol 1, 2, 3 match | STP (1111_xxxx) |
| 1 | 0000_0111, 0000_1011, 0001_0011, 0010_0011, 0100_0011, 1000_0011 | Symbol 2 = 0000_0011 | EDB (0000_0011) |
| 2 | Hamming distance of 2 from 0000_0000 | Symbol 2 = IDL & Symbol 3 = IDL | IDL |
| 2 | Hamming distance of 2 from 1111_xxxx (1st 4 bits only) | Len and CRC/parity fields match in Symbol 1, 2, 3 match | STP |
| 2 | Hamming distance of 2 from 0000_1111 | Symbol 2 = ACh and Symbol 3 != IDL | SDP |
| | Anything else other than the STP, SDP, IDL, EDB | | Framing error |

Using the IDL Framing Token as an example, a first Symbol can be received that has a single bit flip (e.g., 0000_0001). It can be determined that closest hamming distance is 0000_0000, which corresponds to IDL. The inference that the Framing Token is an IDL can be validated using a subsequent Symbol, which could be 0000_0000.

Using SDP as an example, the first Symbol can be received that has a single bit flip (e.g., 0000_1110). It can be determined that the closes hamming distance is 0000_1111, which corresponds to SDP. So, an inference can be made that the Framing Token is SDP. The inference can be validated using a subsequent Symbol, which could be ACh (0011_0101). A third Symbol can also be used to validate the EDB Framing Token.

4) If first Symbol is SDP and second Symbol is at a Hamming Distance of 1 or 2 from ACh, assume it is SDP.

5) If first Symbol is EDB and two of the next three Symbols is EDB, assume it is EDB.

For re-timer with multiple Lanes, any errors in Framing Token does not cause an entry to Recovery. The Retimer needs to add/delete SKPs for clock compensation. It can infer the correct Sync Header by simply performing a majority voting to ignore a mismatch in up to two Lanes (represents 1 to 4 bit flips) and still be safe as long as the rest of the Lanes (2+) gives the correct and identical sync header. While the proposed invention relaxes the Framing Error requirements for multi-Lane Links, the Lane Error Log must reflect the actual errors that can be identified down to the Lane where it occurred.

Figure 3:
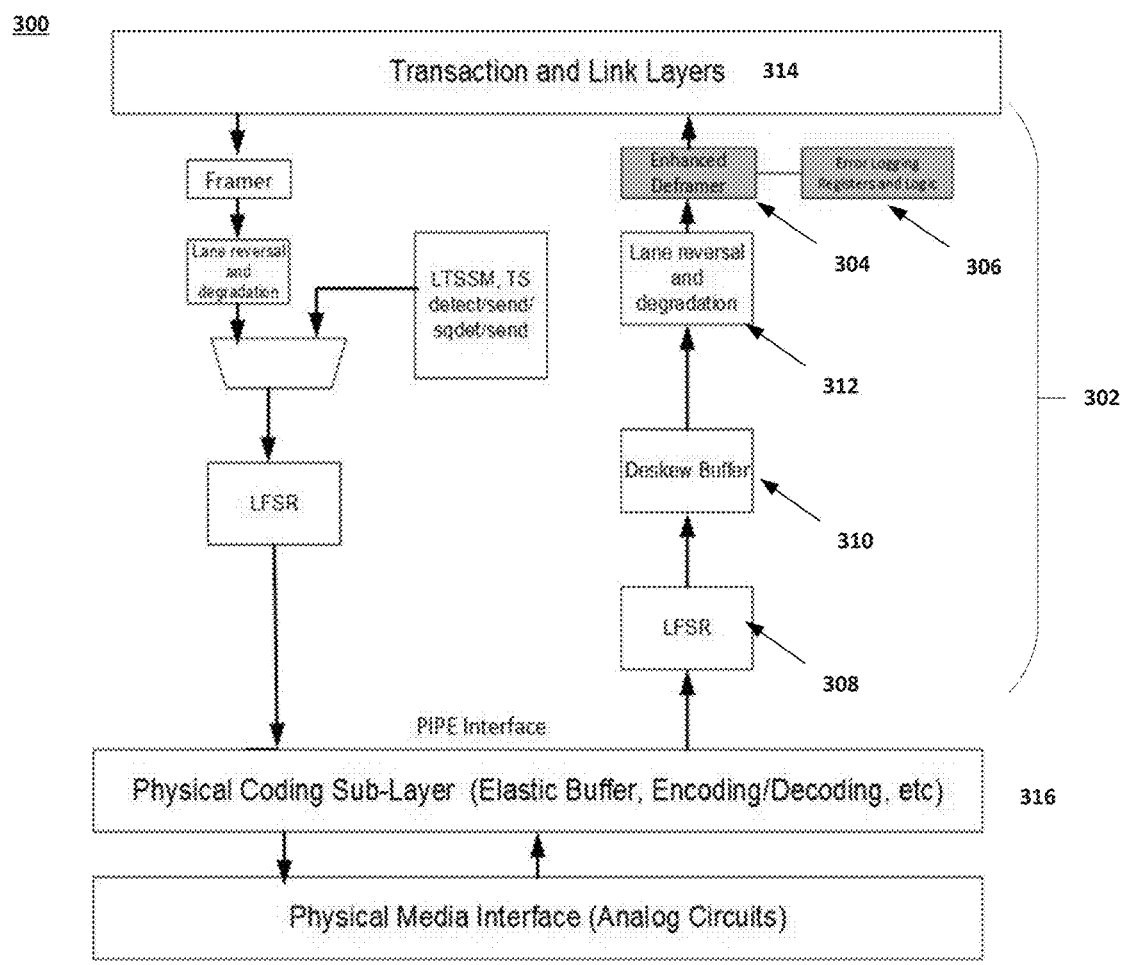
FIG. 3 is a schematic diagram of a physical layer circuit diagram that includes a deframer circuit and an error log in accordance with embodiments of the present disclosure.

FIG. 3 is a schematic diagram of a physical layer circuit 302 that includes a deframer circuit 304 and an error log 306 in accordance with embodiments of the present disclosure. The physical layer circuit 302 is part of a physical layer interface between the transaction and Link layers 314 and the physical coding sublayer 316 of a PCIe compliant device 300 (upstream or downstream device and transmitter or receiver). The physical layer circuitry can include a linear feedback shift register (LFSR) 308, a deskew buffer 310, a Lane reversal and degradation element (LRDE) 312, and the deframer 304 and error log 306. A data packet can be received by the deframer 304 through the LFSR 308, deskew buffer 310, and LRDE 312

The deframer circuit 304 uses the redundant information present in packets received across multi-Lane Links to correct bit flips in the physical layer Framing bits. The deframer circuit 304 can include a set of configuration registers to perform error checks and rules handling on a Lane-by-Lane basis. The deframer circuit 304 can report errors by a connected error log 306. The deframer circuit 304 can perform one or more of the error handling operations as described below in FIGS. 4A-4B and FIGS. 5A-5C.

Figure 4A:
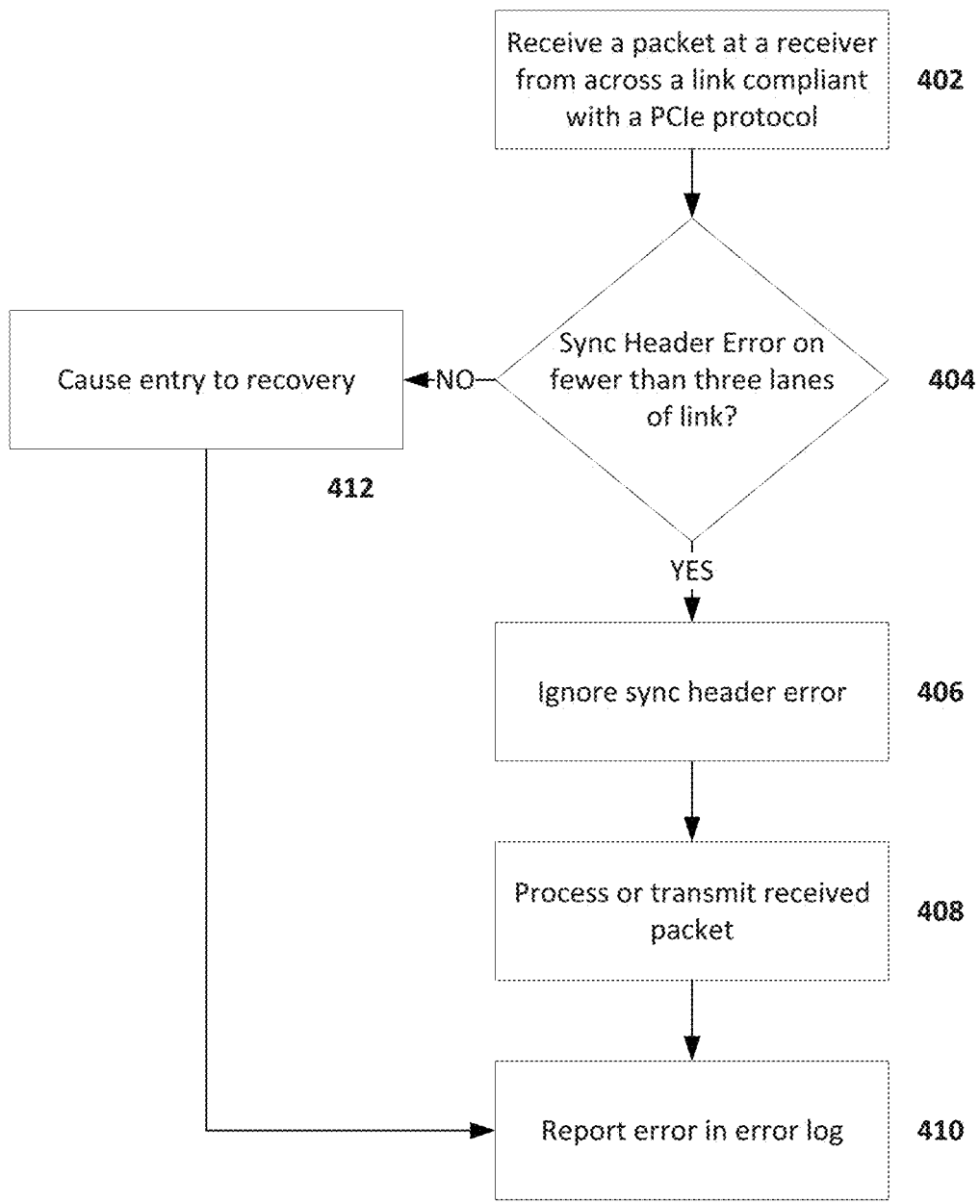
FIG. 4A is a process flow diagram for handling a sync header error received across a multi-Lane Link in accordance with embodiments of the present disclosure.

FIG. 4A is a process flow diagram 400 for handling a sync header error received across a multi-Lane Link of width greater than or equal to 4 in accordance with embodiments of the present disclosure. A data packet can be received from across a multi-Lane Link (402). It can be determined whether a sync header error exists in fewer than three of the Lanes of the multi-Lane Link (404). If fewer than three of the Lanes present a sync header error, then the sync header error can be ignored (406). The packet can be processed and/or transmitted in accordance with the nature of the data packet (408). The error can be reported into an error log (410). If three or more Lanes present a sync header error, then the receiver causes a Link to enter recovery (412). The error can be logged (410).

Figure 4B:
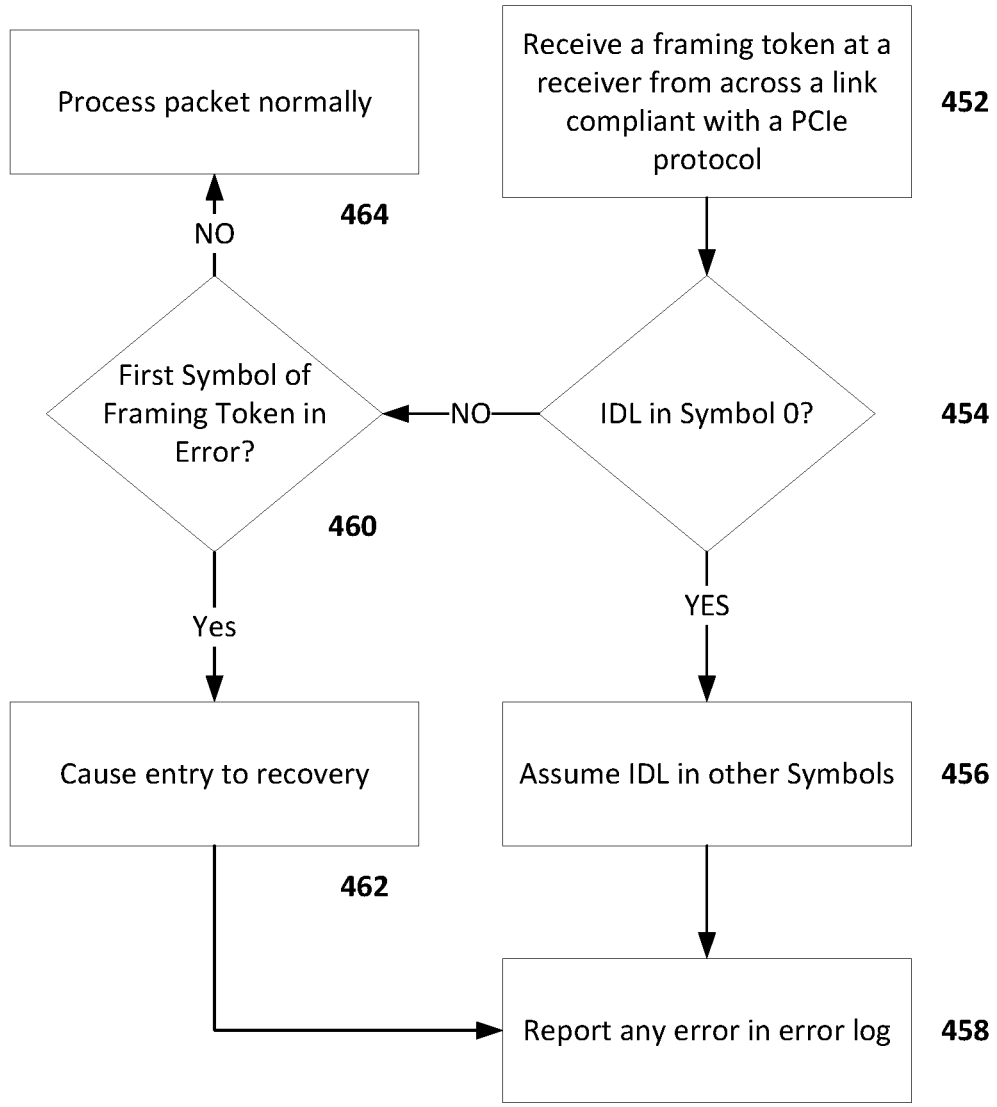
FIG. 4B is a process flow diagram for handling an idle Token error received across a multi-Lane Link in accordance with embodiments of the present disclosure.

FIG. 4B is a process flow diagram for handling an idle Token error received across a multi-Lane Link of width greater than or equal to 4 in accordance with embodiments of the present disclosure. A Framing Token can be received from across a multi-Lane Link (452). It can be determined whether an IDL is received on symbol 0 of the Framing Token of the multi-Lane Link (454). If an IDL is received on the first Symbol of the Framing Token located in Lane 0, 4, 8, or 12 then all subsequent Lanes in the same Symbol time can be considered to be in IDL (456). If the first Symbol of the Framing Token is IDL, all subsequent Lanes that are not IDL bits can be treated as IDL, and to the extent that there are subsequent Symbols that do not present as IDL, the error can be logged in an error log (458).

If an IDL is not received on Symbol 0, it can be determined whether any error exists in the first symbol (460). If there is an error in the first received symbol, then the Link can be sent to recovery (462). The error can be logged (458).

If no errors are detected, then the packet can be processed in accordance with the packet information (464).

Figure 5A:
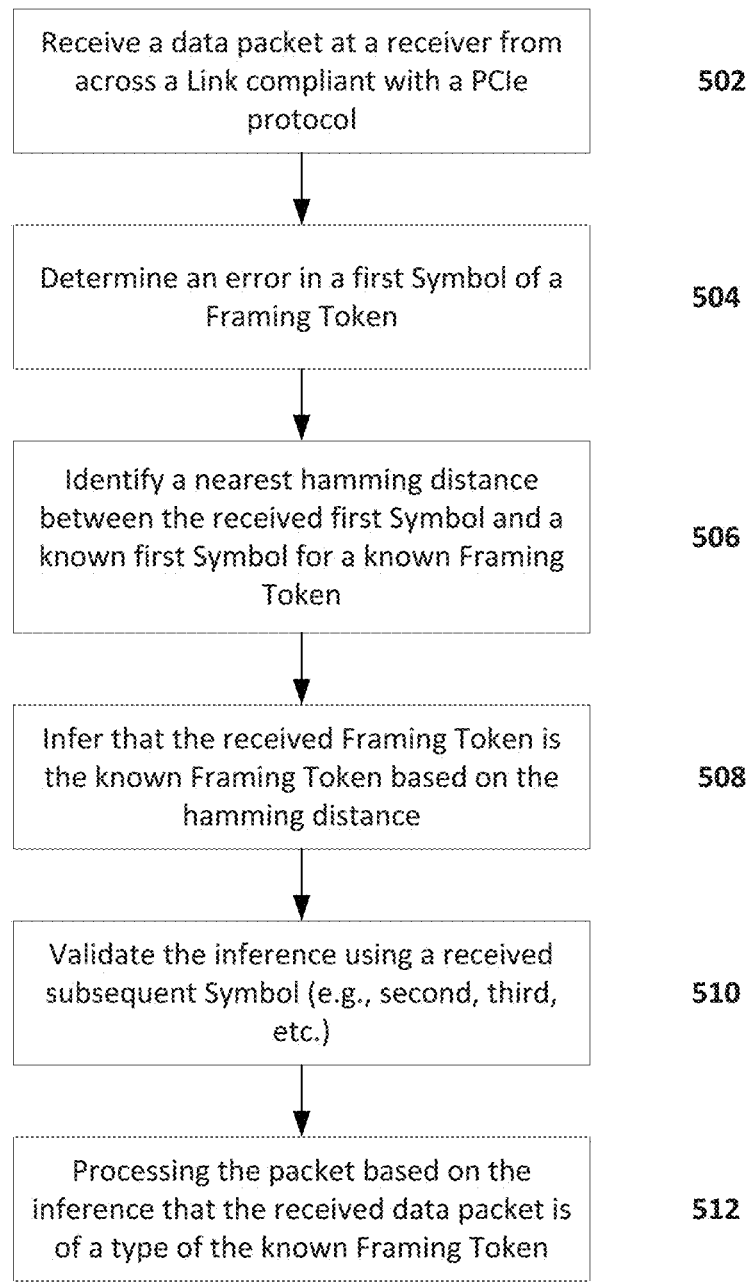
FIG. 5A is a process flow diagram for handling a Symbol error in a Framing Token received across a multi-Lane Link in accordance with embodiments of the present disclosure.

FIG. 5A is a process flow diagram 500 for handling a Symbol error in a Framing Token received across a multi-Lane Link in accordance with embodiments of the present disclosure. A deframer circuit can receive a data packet from across a multi-Lane Link (e.g., a multi-Lane Link compliant with the Peripheral Component Interconnect Express (PCIe) protocol) (502). The deframer circuit can determine that an error is present in a first Symbol of a Framing Token (504). The deframer circuit can identify a nearest hamming distance between the received first Symbol and a known first Symbol for a known Framing Token (506).

For example, the deframer circuit can determine that a received packet includes a Framing Token with an error (e.g., a bit flip) on a first Symbol. For a received first Symbol 0000_1110, a nearest hamming distance can be a single bit to 0000_1111, which would correspond to an SDP. Upon determining the nearest hamming distance, the deframer circuit can infer that the correct Symbol should be 0000_1111, which corresponds to an SDP Framing Token (508). The deframer circuit can validate the inference using a second Symbol of the Framing Token (510). For an inference of an SDP type packet, the deframer circuit can determine that the second Token is equal to ACh. The deframer can then treat the packet as the known packet type (512). If the deframer determines the second Symbol does not validate the inference, then the deframer circuit can use a third Symbol for validation. If no validation can be made, then the deframer causes the Link to enter recovery.

In embodiments, the error on the first Symbol of the Framing Token can include two bit flips. The deframing circuit can still make an inference using the nearest hamming distance to a known bit, but would use both the second and third bits to validate the inference.

For example, for a received first Symbol of 0001_1101, the deframer circuit can infer that the correct first Symbol should be 0000_1111 and SDP type based on a nearest hamming distance. The deframer can then validate the inference by determining that the second Symbol is Ach and the third Symbol is not IDL. The deframer circuit can then process the data packet as if it were SDP.

[FIG. 5B Hamming distance for 2nd Symbol is unnecessary—what we should say is that if the first Symbol is SDP—then we can ignore any error in 2$^{nd}$ Symbol (i.e., other than ACh)—treat it as a SDP Token and log the error for the 2$^{nd}$ Symbol. Please change the diagram and text accordingly.] In embodiments, the deframer can determine that the first Symbol is correct but that a bit flip exists on a second Symbol. FIG. 5B is a process flow diagram 550 for handling an error in a subsequent Symbol of an SDP Framing Token in accordance with embodiments of the present disclosure. The deframer circuit can receive a packet with a Framing Token at a receiver from across a Link compliant with a PCIe protocol (552). The deframer circuit can determine that the Framing Token is an SDP type Framing Token based on a first Symbol received (554). The deframer circuit can identify an error in a second Symbol of the received Framing Token (556).

The deframer circuit can identify a nearest hamming distance between the received second Symbol and a second Symbol associated with an SDP Framing Token (558). The deframer circuit can infer that the received Framing Token is an SDP type Framing Token based on the hamming distance of the received second and the second Symbol of an SDP Framing Token (560). The deframer circuit can validate the inference using a received subsequent Symbol (e.g., second, third, etc.) (652). The deframer circuit can process the packet based on the inferred known Framing Token (564).

Figure 5C:
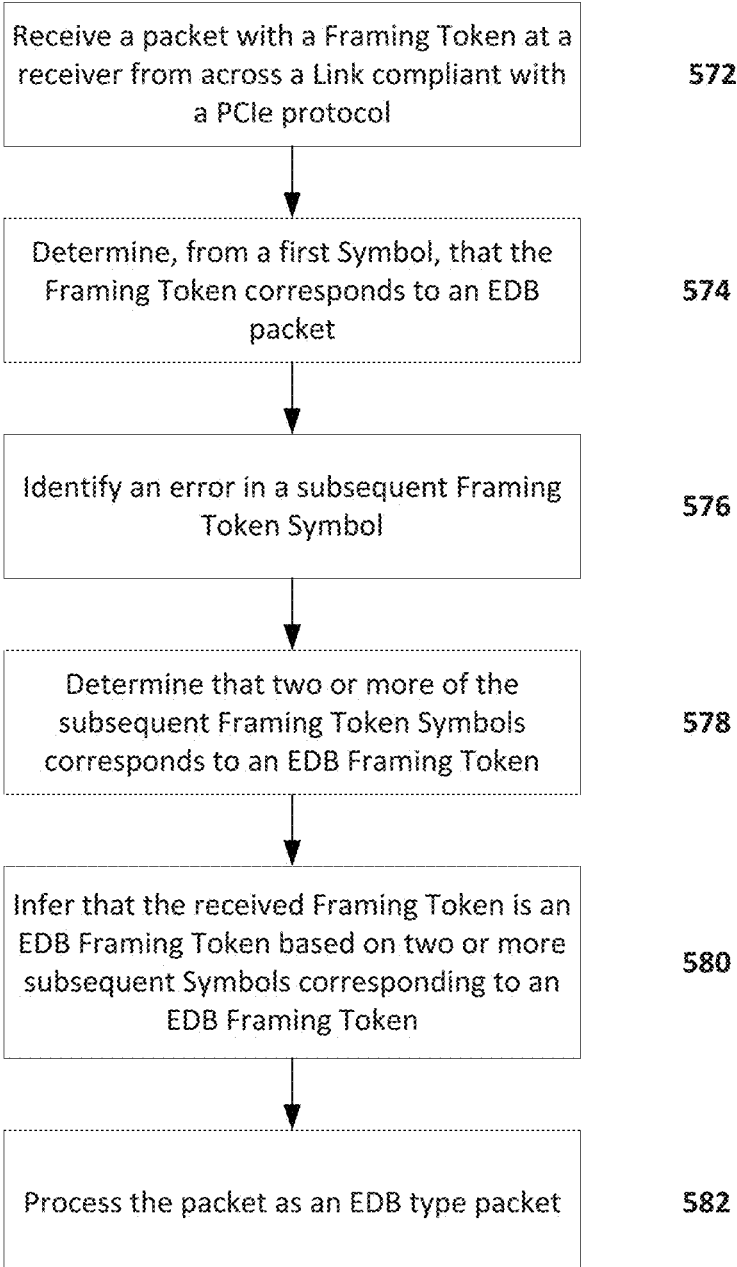
FIG. 5C is a process flow diagram for handling an error in a subsequent Symbol of an end bad (EDB) Framing Token in accordance with embodiments of the present disclosure.

[It is EDB] FIG. 5C is a process flow diagram 570 for handling an error in a subsequent Symbol of an end bad (EDB) Framing Token in accordance with embodiments of the present disclosure. The deframer circuit can receive a packet with a Framing Token at a receiver from across a Link compliant with a PCIe protocol (572). The deframer circuit can determine, from a first Symbol, that the Framing Token corresponds to an EDB packet (574). The deframer circuit can identify an error in a subsequent Framing Token Symbol (576). The deframer circuit can determine that two or more of the subsequent Framing Token Symbols corresponds to an EDB Framing Token (578). The deframer circuit can infer that the received Framing Token is an EDB Framing Token based on two or more subsequent Symbols corresponding to an EDB Framing Token (580). The deframer circuit can process the packet as an EDB type packet (582).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
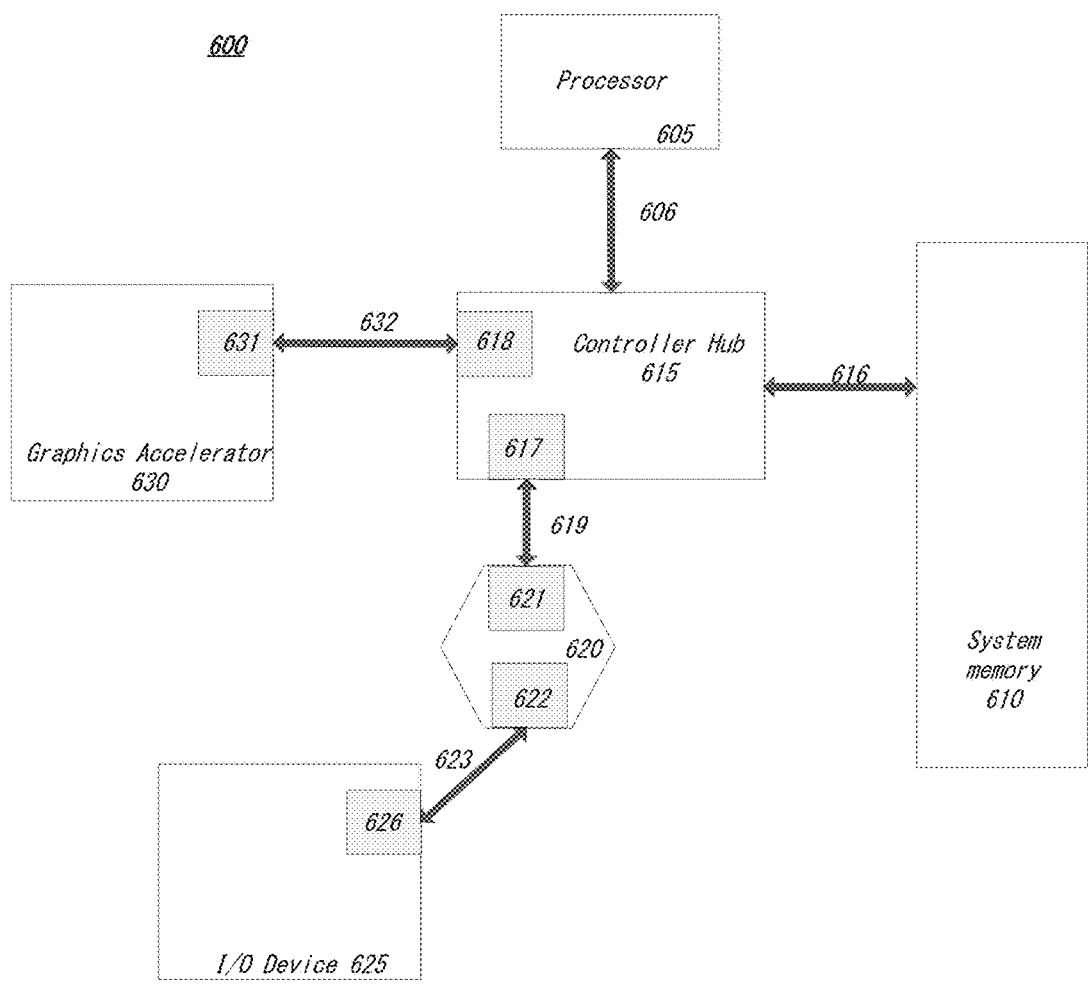
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, Link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial Link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial Link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
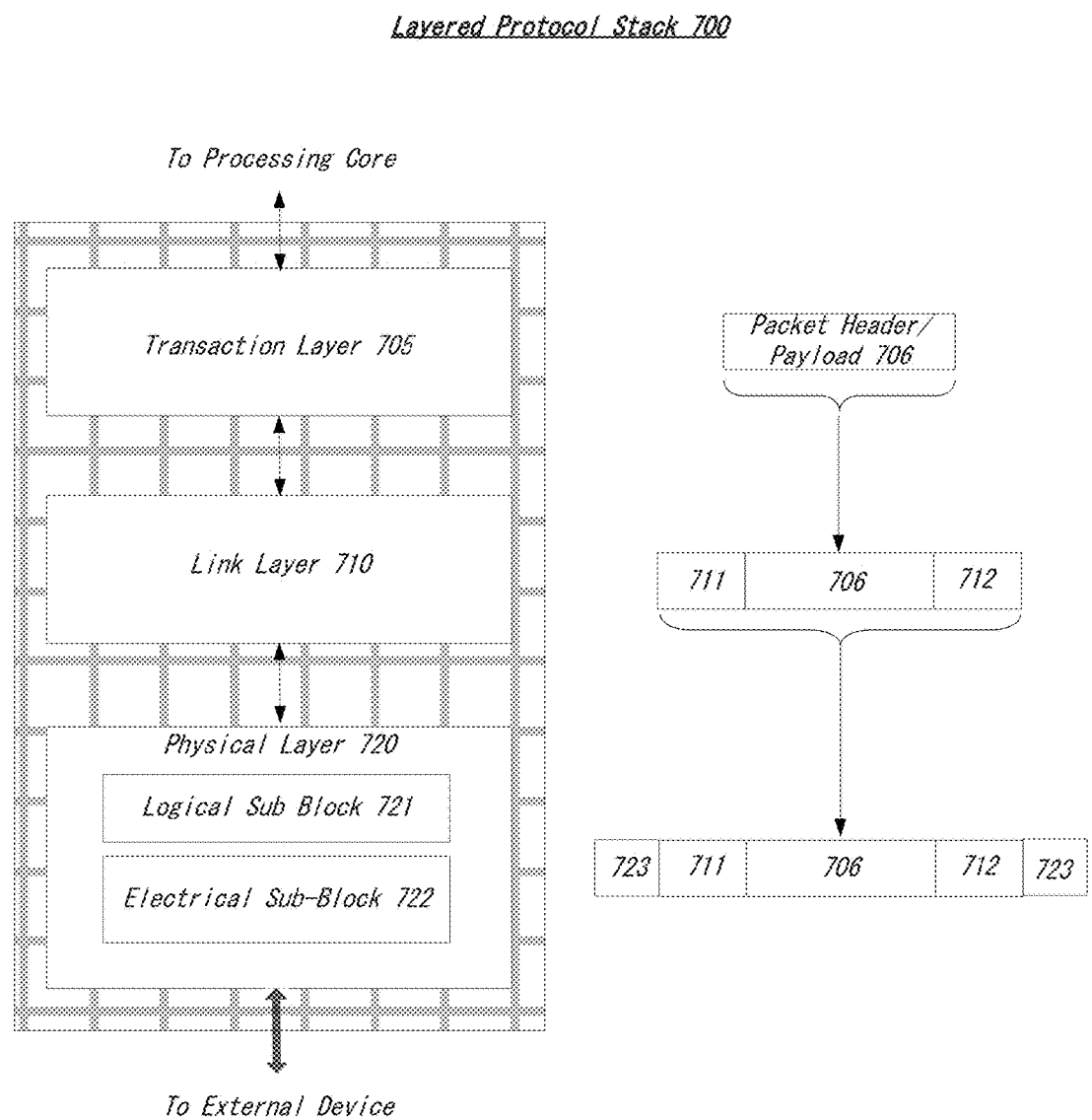
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCie stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, Link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data Link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a Link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the Link, such as controller hub 615 in FIG. 6, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
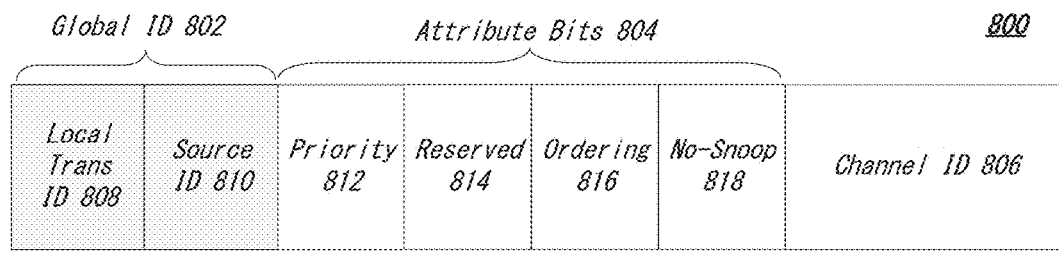
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data Link layer 710, acts as an intermediate stage between transaction layer 705 and the physical layer 720. In one embodiment, a responsibility of the data Link layer 710 is providing a reliable mechanism for exchanging Transaction Layer Packets (TLPs) between two components a Link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with Symbols, which the transmitter serializes and transmits onto to an external device. The receiver is supplied with serialized Symbols from an external device and transforms the received signals into a bit-stream. The bit-stream is de-serialized and supplied to logical sub-block 721. In one embodiment, an 8b/10b transmission code is employed, where ten-bit Symbols are transmitted/received. Here, special Symbols are used to Frame a packet with Frames 723. In addition, in one example, the receiver also provides a Symbol clock recovered from the incoming serial stream.

As stated above, although transaction layer 705, Link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a Link layer; and a third layer to transmit the packets, i.e. a physical layer. As a specific example, a common standard interface (CSI) layered protocol is utilized.

Figure 9:
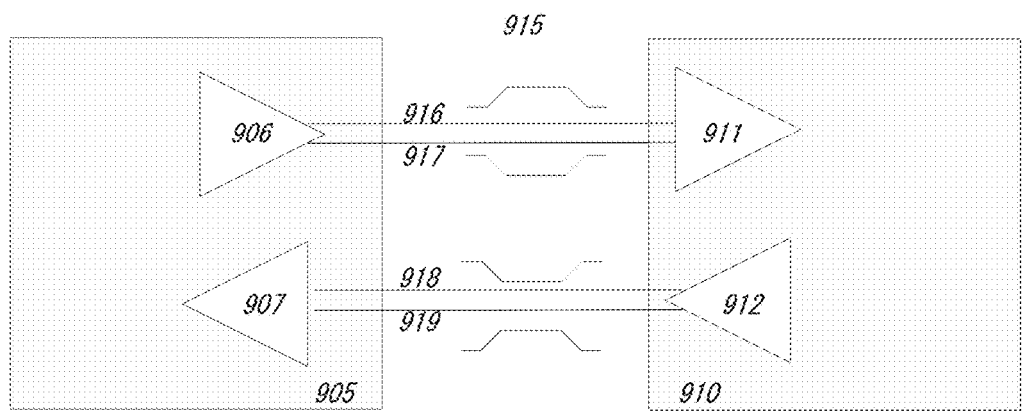
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point Link is illustrated, a serial point-to-point Link is not so limited, as it includes any transmission path for transmitting serial data. In the embodiment shown, a basic PCIe Link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe Link.

A transmission path refers to any path for transmitting data, such as a transmission line, a copper line, an optical line, a wireless communication channel, an infrared communication Link, or other communication path. A connection between two devices, such as device 905 and device 910, is referred to as a Link, such as Link 915. A Link may support one Lane—each Lane representing a set of differential signal pairs (one pair for transmission, one pair for reception). To scale bandwidth, a Link may aggregate multiple Lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
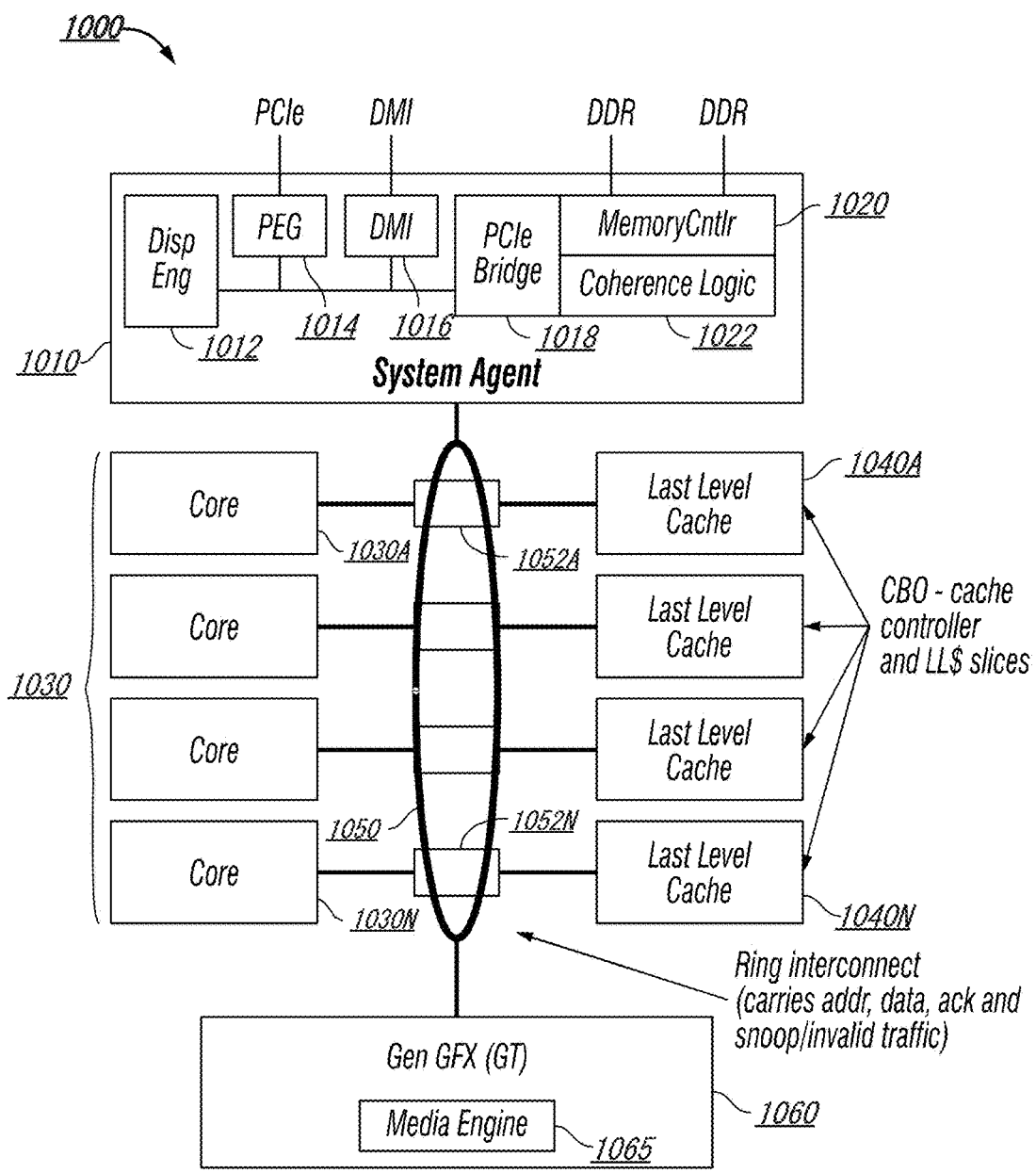
FIG. 10 illustrates a block diagram of an embodiment of a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is a physical layer circuit apparatus to process an error in a data packet, the physical layer circuit apparatus including a receiver to receive a data packet from across a multilayer data Link, the data packet comprising a Framing Token; logic circuitry to detect an error in a received Symbol of a physical layer Framing Token; logic circuitry to identify a known Framing Token based on one or more other received Symbols associated with the Framing Token; and logic circuitry to validate the identified known Token by comparing a the received Symbol of the identified known Framing Token of with a corresponding Symbol of the known Framing Token.

Example 2 may include the subject matter of example 1, and also include logic circuitry to process the received data packet based on the identified known Framing Token.

Example 3 may include the subject matter of any of examples 1 or 2, wherein the known Framing Token comprises one of an idle Framing Token, a start transaction layer packet (STP) Framing Token, start of data Link layer packet (SDP) Framing Token, or end bad (EDB) packet Framing Token.

Example 4 may include the subject matter of any of examples 1-3, wherein the nearest hamming distance between the first Symbol of the Framing Token of the received data packet and the first Symbol of the known Framing Token comprises a single bit.

Example 5 may include the subject matter of any of examples 1-4, and can also include logic circuitry to log the error detected in the first Symbol of the physical layer Framing Token of the received data packet.

Example 6 may include the subject matter of any of examples 1-5, wherein the subsequent bit comprises one or more of a second Symbol of the Framing Token of the received data packet or a third Symbol of the Framing Token of the received data packet.

Example 7 may include the subject matter of any of examples 1-6, and can also include logic circuitry to identify a known Framing Token based on one or more other received Symbols associated with the received Framing Token based on a nearest hamming distance between a first Symbol of the Framing Token of the received data packet and a first Symbol of a known Framing Token; and logic circuitry to validate the Framing Token by comparing a second Symbol of the known Framing Token with a second Symbol of the received Framing Token.

Example 8 may include the subject matter of example 7, wherein the detected error is in a second or subsequent Symbol of the Framing Token; the apparatus can also include logic circuitry to identify a known Framing Token based on a first Symbol of the received Framing Token; and logic circuitry to validate the known Framing Token by determining a closest hamming distance for a second Symbol of the received Framing Token with a second Symbol of the known Framing Token.

Example 9 may include the subject matter of example 7, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an SDP Framing Token based on the hamming distance.

Example 10 may include the subject matter of example 7, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an EDB Framing Token based on the hamming distance.

Example 11 is a method performed at a receiver configured to receive a data packet from a multi-Lane Link compliant with a Peripheral Component Interconnect Express (PCIe) protocol, the method including receiving a data packet from across a multilayer data Link, the data packet comprising a Framing Token; detecting an error in a received Symbol of a physical layer Framing Token; identifying a known Framing Token based on one or more other received Symbols associated with the Framing Token; validating the identified known Token by comparing a the received Symbol of the identified known Framing Token of with a corresponding Symbol of the known Framing Token.

Example 12 may include the subject matter of example 11, and can also include using the identified known Framing Token to process the received data packet.

Example 13 may include the subject matter of any of examples 11-12, wherein the known Framing Token comprises one of an idle Framing Token, a start transaction layer packet (STP) Framing Token, start of data Link layer packet (SDP) Framing Token, or end bad (EDB) packet Framing Token.

Example 14 may include the subject matter of any of examples 11-13, wherein the nearest hamming distance between the first Symbol of the Framing Token of the received data packet and the first Symbol of the known Framing Token comprises a single bit.

Example 15 may include the subject matter of any of examples 11-14, and can also include logging the error detected in the first Symbol of the physical layer Framing Token of the received data packet in an error log memory element connected to the physical layer circuit apparatus.

Example 16 may include the subject matter of any of examples 11-15, wherein the subsequent bit comprises one or more of a second Symbol of the Framing Token of the received data packet or a third Symbol of the Framing Token of the received data packet.

Example 17 may include any of the subject matter of examples 11-16, and can also include identifying a known Framing Token based on one or more other received Symbols associated with the received Framing Token based on a nearest hamming distance between a first Symbol of the Framing Token of the received data packet and a first Symbol of a known Framing Token; and validating the Framing Token by comparing a second Symbol of the known Framing Token with a second Symbol of the received Framing Token.

Example 18 may include the subject matter of example 17, wherein the detected error is in a second or subsequent Symbol of the Framing Token; the method can also include identifying a known Framing Token based on a first Symbol of the received Framing Token; and validating the known Framing Token by determining a closest hamming distance for a second Symbol of the received Framing Token with a second Symbol of the known Framing Token.

Example 19 may include the subject matter of example 17, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an SDP Framing Token based on the hamming distance.

Example 20 may include the subject matter of example 17, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an EDB Framing Token based on the hamming distance.

Example 21 is a system that includes an upstream device to transmit a data packet across a multi-Lane Link compliant with a Peripheral Component Interconnect Express (PCIe) protocol; and a downstream device connected to the upstream device across a multi-Lane Link, the downstream device comprising a receiver that comprises a deframer logic, the deframer logic to identify a Framing error in a received data packet received on one Link of the multi-Lane Link; determine that one or more other data packets received on one or more other Links of the multi-Lane Link do not present a Framing error; and process the received data packet based on the one or more other data packets received on the one or more other Links.

Example 22 may include the subject matter of example 21, wherein the deframer logic is configured to determine that a first data packet received on a first Link comprises an error in a sync header as the Framing error; determine that a second data packet received on a second Link does not comprise an error in a sync header; process the first data packet using a policy corresponding to the second data packet; and log the error in the sync header in an error log coupled to the deframer logic.

Example 23 may include the subject matter of example 21, wherein the deframer logic is configured to determine that an idle Token was received in Lane 0 of the multi-Lane Link; determine that a non-idle Token was received in a subsequent Lane of the multi-Lane Link; and treat all Lanes as idle until a non-idle data packet is received in Lane 0; and log the error in an error log coupled to the deframer logic.

Example 24 may include the subject matter of example 21, wherein the deframer logic is configured to detect an error in a received Symbol of a physical layer Framing Token in the received data packet; identify a known Framing Token based on one or more other received Symbols associated with the Framing Token; and validate the identified known Token by comparing a the received Symbol of the identified known Framing Token of with a corresponding Symbol of the known Framing Token.

Example 25 may include the subject matter of example 21, wherein the deframer logic is configured to identify a known Framing Token based on a first Symbol of the received Framing Token; and validate the known Framing Token by determining a closest hamming distance for a second Symbol of the received Framing Token with a second Symbol of the known Framing Token.

What is claimed is:

1. A physical layer circuit apparatus to process an error in a data packet, the physical layer circuit apparatus comprising:
   a receiver to receive a data packet from across a multilayer data Link, the data packet comprising a received Framing Token;
   logic circuitry to detect an error in a received Symbol of the received Framing Token;
   logic circuitry to identify a known Framing Token based on one or more other received Symbols associated with the received Framing Token;
   logic circuitry to validate the identified known Framing Token by comparing a received Symbol of the received Framing Token with a corresponding Symbol of the known Framing Token.

2. The physical layer circuit apparatus of claim 1, further comprising logic circuitry to process the received data packet based on the identified known Framing Token.

3. The physical layer circuit apparatus of claim 1, wherein the known Framing Token comprises one of an idle Framing Token, a start transaction layer packet (STP) Framing Token, start of data Link layer packet (SDP) Framing Token, or end bad (EDB) packet Framing Token.

4. The physical layer circuit apparatus of claim 1, wherein the nearest hamming distance between a first Symbol of the received Framing Token of the received data packet and a first Symbol of the known Framing Token comprises a single bit.

5. The physical layer circuit apparatus of claim 1, further comprising logic circuitry to log the error detected in a first Symbol of the physical layer Framing Token of the received data packet.

6. The physical layer circuit apparatus of claim 1, further comprising:
   logic circuitry to identify a known Framing Token based on one or more other received Symbols associated with the received Framing Token based on a nearest hamming distance between a first Symbol of the Framing Token of the received data packet and a first Symbol of a known Framing Token; and
   logic circuitry to validate the Framing Token by comparing a second Symbol of the known Framing Token with a second Symbol of the received Framing Token.

7. The physical layer circuit apparatus of claim 1, wherein the detected error is in a second or subsequent Symbol of the Framing Token;
   the apparatus further comprising:
   logic circuitry to identify a known Framing Token based on a first Symbol of the received Framing Token; and
   logic circuitry to validate the known Framing Token by determining a closest hamming distance for a second Symbol of the received Framing Token with a second Symbol of the known Framing Token.

8. The physical layer circuit apparatus of claim 7, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an SDP Framing Token based on the hamming distance.

9. The physical layer circuit apparatus of claim 7, wherein the first Symbol of the received Framing Token identifies the received Framing Token as an end bad packet (EDB) Framing Token, and at least two of a subsequent three received Symbols of the received Framing Token comprise an EDB symbol, the physical layer circuit apparatus further comprising logic circuitry to treat the Framing Token as an EDB Framing Token.

10. A method performed at a receiver configured to receive a data packet from a multi-Lane Link compliant with a Peripheral Component Interconnect Express (PCIe) protocol, the method comprising:
    receiving a data packet from across a multilayer data Link, the data packet comprising a received Framing Token;
    detecting an error in a received Symbol of the received Framing Token;
    identifying a known Framing Token based on one or more other received Symbols associated with the received Framing Token;
    validating the identified known Token by comparing a received Symbol of the received Framing Token with a corresponding Symbol of the known Framing Token.

11. The method of claim 10, further comprising using the identified known Framing Token to process the received data packet.

12. The method of claim 10, wherein the known Framing Token comprises one of an idle Framing Token, a start transaction layer packet (STP) Framing Token, start of data Link layer packet (SDP) Framing Token, or end bad (EDB) packet Framing Token.

13. The method of claim 10, wherein a nearest hamming distance between a first Symbol of the Framing Token of the received data packet and a first Symbol of the known Framing Token comprises a single bit.

14. The method of claim 10, further comprising logging the error detected in a first Symbol of the received Framing Token of the received data packet in an error log memory element connected to the physical layer circuit apparatus.

15. The method of claim 10, further comprising:
    identifying a known Framing Token based on one or more other received Symbols associated with the received Framing Token based on a nearest hamming distance between a first Symbol of the Framing Token of the received data packet and a first Symbol of a known Framing Token; and
    validating the Framing Token by comparing a second Symbol of the known Framing Token with a second Symbol of the received Framing Token.

16. The method of claim 10, wherein the detected error is in a second or subsequent Symbol of the Framing Token;
    the method further comprising:
    identifying a known Framing Token based on a first Symbol of the received Framing Token; and
    validating the known Framing Token by determining a closest hamming distance for a second Symbol of the received Framing Token with a second Symbol of the known Framing Token.

17. The method of claim 16, wherein the first Symbol of the received Framing Token identifies the received Framing Token as a start of data Link layer packet (SDP) Framing Token, and the second Symbol of the received Framing Token is at a hamming distance of 1 or 2 from ACh, the physical layer circuit apparatus further comprising logic circuitry to treat the Framing Token as an SDP Framing Token based on the hamming distance.

18. The method of claim 16, wherein the first Symbol of the received Framing Token identifies the received Framing Token as an end bad packet (EDB) Framing Token, and at least two of a subsequent three Symbols of the received Framing Token comprise an EDB symbol, the physical layer circuit apparatus further comprising logic circuitry to treat the Framing Token as an EDB Framing Token.

19. A system comprising:
an upstream device to transmit a data packet across a multi-Lane Link compliant with a Peripheral Component Interconnect Express (PCIe) protocol;
a downstream device connected to the upstream device across a multi-Lane Link, the downstream device comprising a receiver that comprises a deframer logic, the deframer logic to:
identify a Framing error in a received data packet received on one Link of the multi-Lane Link;
determine that one or more other data packets received on one or more other Links of the multi-Lane Link do not present a Framing error; and
process the received data packet based on the one or more other data packets received on the one or more other Links of the multi-Lane Link.

20. The system of claim 19, wherein the deframer logic is configured to:
determine that a first data packet received on a first Link comprises an error in a sync header as the Framing error;
determine that a second data packet received on a second Link does not comprise an error in a sync header;
process the first data packet using a policy corresponding to the second data packet; and
log the error in the sync header in an error log coupled to the deframer logic.

21. The system of claim 19, wherein the deframer logic is configured to:
determine that an idle Token was received in Lane 0 of the multi-Lane Link;
determine that a non-idle Token was received in a subsequent Lane of the multi-Lane Link; and
treat all Lanes as idle until a non-idle data packet is received in Lane 0; and
log the error in an error log coupled to the deframer logic.

22. The system of claim 19, wherein the deframer logic is configured to:
detect an error in a received Symbol of a physical layer Framing Token in the received data packet;
identify a known Framing Token based on one or more other received Symbols associated with the Framing Token; and
validate the identified known Token by comparing a the received Symbol of the identified known Framing Token of with a corresponding Symbol of the known Framing Token.

23. The system of claim 19, wherein the deframer logic is configured to:
identify a known Framing Token based on a first Symbol of the received Framing Token; and
validate the known Framing Token by determining a closest hamming distance for a second Symbol of the received Framing Token with a second Symbol of the known Framing Token.

24. The physical layer circuit apparatus of claim 7, wherein the subsequent bit comprises one or more of a second Symbol of the Framing Token of the received data packet or a third Symbol of the Framing Token of the received data packet.

25. The method of claim 16, wherein the subsequent bit comprises one or more of a second Symbol of the Framing Token of the received data packet or a third Symbol of the Framing Token of the received data packet.

* * * * *